MULTI-HEAD MAGNETIC TRANSDUCER

Filed May 1, 1968

INVENTOR

JOSEPH JOHN HANAK

BY Edward J. Norton

ATTORNEY

3,544,982
MULTI-HEAD MAGNETIC TRANSDUCER
Joseph John Hanak, Trenton, N.J., assignor to RCA Corporation, a corporation of Delaware

Filed May 1, 1968, Ser. No. 725,811
Int. Cl. G11b *5/28*
U.S. Cl. 340—174.1 9 Claims

ABSTRACT OF THE DISCLOSURE

An integral multi-head magnetic transducer and method of manufacturing the same which is for example suitable for use in contact or non-contact disc recording. The transducer is comprised of blocks of preferred magnetic material having desired grooved shape and surface smoothness which are united and gap filled by stipulated non-magnetic materials to form a loaf. In one embodiment a non-magnetic base is affixed to the loaf from which selected portions are removed to form an integral head assembly having a series of recording heads at spaced intervals. For certain applications the non-magnetic base may be dispensed with, in which case selected pieces of the loaf are removed at spaced intervals with the remaining portions providing the backing and structural support for the resultant series of magnetic heads. In either case a multiple transducer is provided with accurately located heads and perfectly aligned recording gaps.

BACKGROUND

There has long existed in the magnetic recording art a need for a recording transducer which is durable, small enough to facilitate use in closely spaced multiple head assemblies and yet minimize "cross-talk." Such requirements are dictated by magnetic disk recording apparatus and more particularly random access computer disk recording equipment. The difficulty of fulfilling these requirements in the disk recording art in the past has necessitated the use of a single "flying" head for scanning a large number of tracks which may be as many as 200. However with such an approach, the average access time required to address a given location on the disk is over 60 milliseconds.

By providing one head for each track through the use of a multiple head assembly, addressing can be done electronically which would result in a decrease of access time by a factor of 20. By fabricating these heads from magnetically efficient and wear resistant material, the heads may be used in either non-contact or in-contact applications which provides higher bit density recording.

Although the present invention is particularly applicable to disk recorders, it is to be understood that the principles of the present invention may be utilized in the magnetic recording art generally.

It is therefore an object of the present invention to provide an improved multi-track magnetic head and method of making the same.

It is another object to provide a magnetic transducer which is small, durable, and may be fabricated as a closely spaced multiple head assembly.

It is a further object to provide a multitrack magnetic head assembly having substantially perfect gap alignment.

It is still another object to provide a method of forming a plurality of magnetic transducers as a single entity.

Briefly, in accordance with the present invention, two blocks of a magnetic material having desired magnetic and structural properties are provided with the proper grooved shape and surface smoothness. The blocks are positioned so that their grooved surfaces are in confronting relation. The blocks are united by a preferred bonding material to form a loaf having a gap between the confronting surface, the gap extending between the aperture formed by the grooves and the upper surface of the loaf. A non-magnetic material is disposed in the gap. A base element of non-magnetic material is affixed to the bottom surface of the loaf by a specified bonding material to form an integral unit. The magnetic material of the loaf is removed at spaced intervals along the integral unit to form a series of projecting magnetic core members which constitute a multiple head assembly with perfectly aligned recording gaps. According to another aspect of the present invention, initially the loaf is structured in the manner indicated above. A series of spaced channels are then provided in the loaf which are normal to the gapped surface and which extend partially through the loaf. The projecting cores of magnetic material thus formed, constitute a multiple head assembly with perfectly aligned recording gaps.

Figure 1:
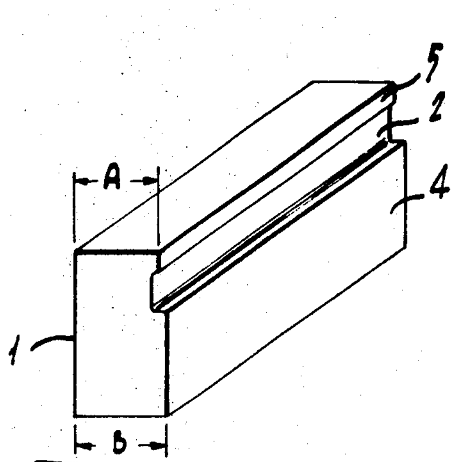
FIG. 1 is a perspective view of a magnetic circuit part of the present invention.
Figures 2, 4:
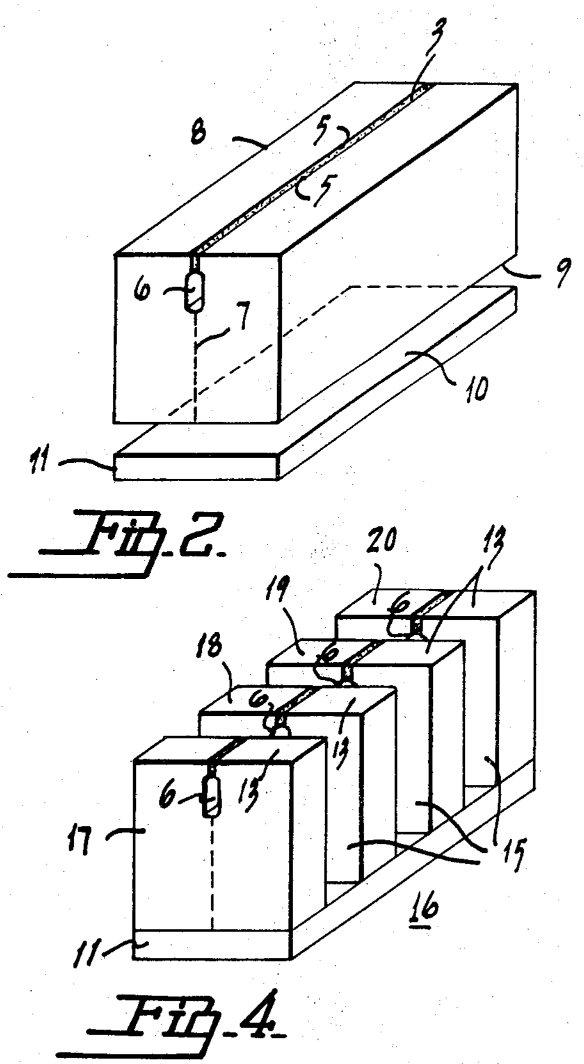
FIG. 2 is a perspective view of a combination of elements which form a part of a magnetic head assembly according to the present invention.
FIG. 4 is a perspective view of one embodiment of a multi-track magnetic head assembly according to the present invention.
Figure 3:
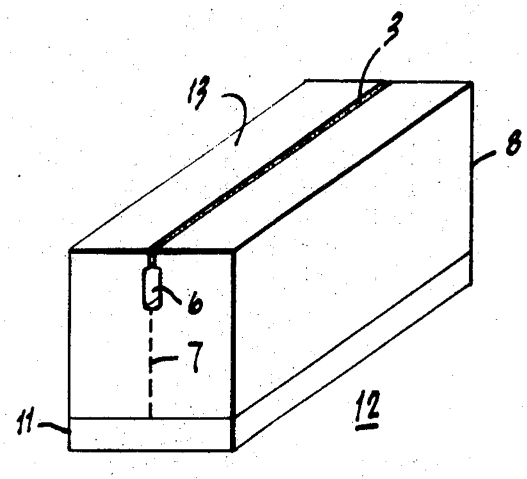
FIG. 3 is a perspective view of a partially completed magnetic head assembly of the present invention.

If reference is made to FIG. 1, there is shown a block 1 of magnetic material preferably constructed of ferrite or a high permeability alloy of iron, silicon and aluminum such as alfenol or one of the high permeability metallic alloys such as mumetal. The block 1 is preferably rectangular in shape with a groove 2 coextensive with the longer dimension of the block 1. The width or thickness of the portion of the block 1 denoted A, is made to be smaller than the thickness of that portion of the block 1 denoted B, by approximately an amount equal to one half of the desired gap dimension for the heads to be constructed. A pair of identical blocks 1, are then placed in juxtaposed position wherein the surfaces 4 are in confronting relation and the surfaces 5 define a gap between the blocks 1. FIG. 2 shows a resultant assembly in which the blocks 1 have been united along line 7 to form a loaf 8, having a longitudinal aperture 6 and a non-magnetic filled gap 3 disposed between the surfaces 5. There is also shown in FIG. 2 a base member 11 whose cross section dimensions may be approximately the same as the loaf 8. The base 11 is constructed of a non-magnetic material and preferably has a coefficient of expansion which is essentially equal to the coefficient of expansion of the material of the loaf 8. The bottom surface 9 of the loaf 8 and the top surface 10 of the base 11 are polished flat to an optical finish. As shown in FIG. 3 the loaf 8 is placed on top of the base 11 and the surfaces 9 and 10 are bonded together to form the magnetic circuit member 12. Details of the materials and method to be used for uniting the block 1, filling the gap and bonding on the base 1, for particular applications are hereinafter disclosed. As shown in FIG. 4 a series of essentially parallel channels 15 are provided at spaced intervals which extend from the top surface 13 down to the base element 11. The result is an integral multihead assembly 16 having projecting cores 17, 18, 19 and 20 which constitute a plurality of recording heads with perfectly aligned gap separated pole pieces. The width of the channels 15 and therefore the thickness of each head may be selected for a given application. For example, in computer disk stations both dimensions may be .005 inch.

Figure 5:
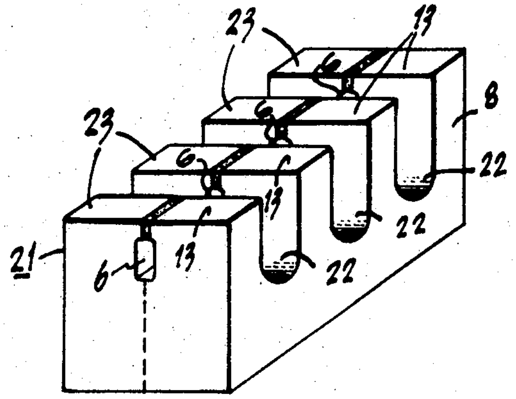
FIG. 5 is a perspective view of another embodiment of a multiple head assembly according to this invention.

In the multiple head assembly thus far disclosed, one function of the non-magnetic base member is to prevent signals from one head from being transmitted to an adjacent head which is commonly known as cross-talk. However, for recording applications where some cross-talk does not pose a problem or where cross-talk is minimized, such as in high frequency recording of say several megahertz, the non-magnetic base may be eliminated. This is possible since the magnetic flux, especially at high frequency, will follow the shortest magnetic path. Therefore, alternatively a multiple head assembly 21 may be provided as shown in FIG. 5 wherein the base is eliminated. The basic magnetic circuit member of this embodiment which is the loaf 8 is constructed in the same manner disclosed above. However, in the present embodiment of FIG. 5 the heads 23 are formed by providing essentially parallel channels 22 which extend from the top surface 13 of loaf 8 only partially through the loaf 8. The portions of the loaf 8 below the channels 22 therefore serve as backing support for the structure. The result is an integral multihead assembly 21, having projecting cores 23 which constitute a plurality of recording heads with perfectly aligned gap separated pole pieces. This type of structure is superior from the standpoint of strength and mechanical stability and is also cheaper and simpler to fabricate.

More particular reference will now be made to the materials and methods of fabricating the multiple track heads of the accompanying drawings.

Figure 6:
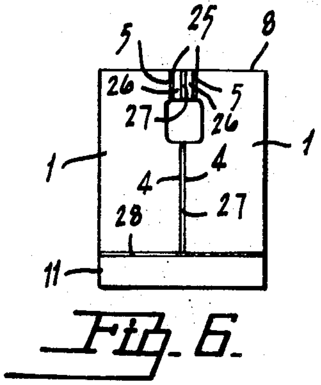
FIG. 6 is an enlarged end view of the assembly of FIG. 3.

If reference is made to FIG. 6 there is shown an enlarged end view disclosing construction details of the assembly 12 of FIG. 3. FIG. 6 shows a loaf 8 of magnetic material comprised of identical blocks 1. Each of the blocks 1 has a non-magnetic gap filler material 26 affixed to the surface 6 by means of the bonding agent 25. The gap filler 26 and surfaces 4 of the blocks 1 are joined by the bonding agent 27. The non-magnetic base member 11 is secured to the loaf 8 by means of bonding agent 28. As previously indicated the blocks comprising the loaf 8 are composed of a magnetic material having low reluctance for example single crystal ferrite such as manganese zinc ferrite or nickel zinc ferrite; or a polycrystalline ferrite having similar constituents; or a high permeability alloy such as alfenol or mumetal. Where the blocks 1 are composed of one of the indicated ferrites, the loaf 8 is preferably structured in the following described manner. A pair of blocks 1 are provided each of which has a thin film of glass 25 on its surface 5 which in turn is covered by a layer 26 of alumina ($Al_2O_3$) or alternatively both the film 25 and the layer 26 are glass. The blocks 1 are positioned with the surfaces 4 confronting each other and with a layer of glass 27 disposed between the layers 26. The loaf 8 is then formed by fusing the blocks 1 together in a vacuum at a temperature of at least 10 degrees centigrade higher than the softening point of the glass 27 and a pressure of at least 2,000 pounds per square inch, which results in the glass layer 27 acting as a flux which diffuses into the ferrite and causes a molecular transport of the ferrite molecules from one ferrite block to the other. The result upon cooling is a bond of the ferrite surfaces 4 which has a reluctance which is of the same order of magnitude as the reluctance of the ferrite of the blocks 1. Since a similar molecular transport does not take place between the layer 27 and layer 26 a gap of relatively high reluctance is provided between the surfaces 5 of the blocks 1. The base 11 which is preferably composed of one of the non-magnetic ceramics such as alumina, glass or steatite is affixed to the bottom surface 9 of the ferrite loaf 8 by the bonding agent 28. The bonding agent 28 may be an organic glue or glass. Where the bond 28 is glass the bonding method is preferably as follows. The bottom surface 9 of the ferrite loaf 8 and the top surface 10 of the non-magnetic base 11 which are to be mated are polished flat to an optical finish. Next a layer of glass of at least 500 angstrom units thick is deposited on each of the mating surfaces 9 and 10 preferably by means of radio frequency sputtering or chemical vapor deposition. Alternately, a thin wafer of glass can be placed between the mating surfaces 9 and 10 instead of depositing a layer of glass on the mating surfaces. Then the loaf 8 and base 11 which are to be mated are placed in a vacuum of from $10^{-2}$ to $10^{-3}$ torr with the mating surfaces 9 and 10 facing each other, under an applied pressure of from 2,000 to 6,000 lb./in.$^2$ normal to the mating surfaces and at a temperature of at least 10° centigrade greater than the softening point of the bonding glass 28 used. These conditions are maintained for a period of at least 10 minutes. As a result the ferrite loaf 8 is affixed to the non-magnetic base 11 by means of the glass bond 28 to form the integral unit 12 as shown in FIG. 3. A variety of glasses can be used for the bonding agent 28, however it should preferably have a softening point not exceeding that of the glass bonding agents 25 and 27 used in constructing the loaf 8 and also preferably not exceeding the softening point of the base 11 when it is composed of glass. Although high softening point glasses such as Pyrex have been successfully employed for the bonding agent 28, it is preferable to use lower softening point glasses such as lead glass.

Alternatively, the loaf 8 in base assembly 12 is structured in the same manner just described, however, the nonmagnetic base 11 is instead comprised of a non-magnetic metal which is light, strong and non-corrosive such as aluminum, titanium, magnesium, stainless steel, brass, beryllium or beryllium-copper. Where the base 11 is one of the indicated non-magnetic metals, an organic glue such as epoxy cement is used as the bonding agent 28 to unite the loaf 8 and base 11. This bond is not as strong as the glass bond, but it is sufficient in most applications. Where an organic glue bond 28 is used, it is preferable to roughen the flat mating surfaces 9 and 11 for example by sand blasting before the bonding operation. Further variations are possible for the assembly 12 wherein the blocks 1 are again composed of ferrite with the gap filler 26 being beryllium-copper, hard electroplated chromium, silicon monoxide (SiO) or mica, which is bonded to the surface 5 of blocks 1 by the bonding agent 25 which is an organic glue such as epoxy cement. An organic glue such as epoxy is also used for the bond 27 which unites the blocks 1 to form the loaf 8. Where the bonding agents 25 and 27 are epoxy the gap filler 26 may also be epoxy. In those embodiments where the bonding agents 25 and 27 are an organic glue, the base material 11 may be one of the non-magnetic ceramics such as glass, alumina, steatite, or a light, strong non-corrosive non-magnetic metal such as aluminum, titanium, magnesium, stainless steel, brass, beryllium or beryllium-copper. Where the base 11 is a non-magnetic metal, the bonding agent 28 should preferably be an organic glue so as not to destroy the bonds 25 and 27 by exposing them to the high temperatures required if a glass bonding agent 28 were used. As a further alternative for the assembly 12, the blocks 1 may be comprised of a high permeability alloy such as alfenol or mumetal with the gap filler 26 being beryllium-copper, hard electroplated chromimum, SiO or mica and the bonding agents 25 and 27 are an organic glue such as epoxy cement. The base 11 again is preferably one of the non-magnetic ceramics such as glass, alumina, steatite, or a light, strong, non-corrosive non-magnetic metal such as aluminum, titanium, magnesium, stainless steel, brass, beryllium, or beryllium-copper which is joined to the loaf 8 by the bonding agent 28 which is an organic glue.

For all the embodiments thus far described in reference to FIG. 6 the final multiple transducer assembly 16 as shown in FIG. 4 is produced by providing a series of magnetic heads 17 through 20 which project from the base 11. The projecting heads 17 through 20 are provided by machining out sections of the loaf 8 down to the base 11 at spaced intervals for example by means of a diamond cutting wheel. Alternatively, the desired sections can be removed by high energy laser machining which vaporizes the material where cuts are desired. Electrical machining methods such as spark cutting or electron-beam machining may also be used to cut out the desired sections in forming either the final multiple head assembly 16 of FIG. 4 or assembly 21 of FIG. 5. However, where electrical machining methods are used, the magnetic material of the blocks 1 is preferably an electrically conductive high permeability alloy such as alfenol or mumetal or single crystal or polycrystalline conductive ferrite. It is not necessary that elements 25, 26 and 27 also be electrically conductive. Where the blocks 1 are conductive ferrite, the gap filler 26 is alumina or glass with the bonding agents 25 and 27 being glass. An organic glue such as epoxy may also be used here for the gap filler 26 and bonding agents 25 and 27. In the embodiment of FIG. 4, where the base 11 is employed in conjunction with an electrically conductive magnetic material for the loaf 8, the base 11 should be preferably a light, strong and non-corrosive non-magnetic metal such as aluminum, titanium, magnesium, stainless steel, brass, beryllium or beryllium-copper which is secured to the loaf 8 by means of an organic glue bonding agent 28 such as conductive epoxy. Where the blocks 1 are either alfenol or mumetal and electrical machining methods are to be used to form the final assembly, the gap filler 26 is either beryllium-copper, SiO or mica with the bonding agents 25 and 27 being an organic glue. Here again if a base 11 is used, as in the assembly 12 of FIG. 4, it should be a light, strong non-corrosive non-magnetic metal such as aluminum, titanium, magnesium, stainless steel, brass, beryllium or beryllium-copper which is secured to the loaf 8 by means of the bonding agent 28 such as conductive epoxy.

Following the fabrication of the assemblies 16 or 21 signal transfer means in the form of one or more turns of wire are looped through the aperture 6 and about the core of each of the heads of the assembly. For additional structural support the open spaces between the heads below the recording surface plane 13 may be filled with an organic potting compound.

It has been found that the structure of the present invention in conjunction with the materials disclosed is suitable for both contact and non-contact recording applications except in those embodiments where the gap filler 26 is mica or epoxy which are more suitable for non-contact recording.

What is claimed is:

1. A magnetic transducer assembly comprising in combination:

(a) a plurality of ferrite circuit parts arranged in paired relation and having a given reluctance, each of said pairs forming a core having oppositely positioned and separated pole pieces to form a gap therebetween;

(b) a film of alumina dimensioned to a thickness determined by a desired gap width;

(c) means bonding said alumina to said circuit parts in the vicinity of said gap to fill said gap with said alumina film to form a gap having a high reluctance compared to said given reluctance;

(d) further means by which said parts are united at the remaining contacting surfaces of said parts by molecular transport to provide a reluctance which is substantially the same as said given reluctance;

(e) a base of non-magnetic material; and (f) means by which each of said pairs of united circuit parts are bonded to said base in desired spaced relation to said other circuit pairs.

2. A magnetic transducer assembly comprising; a base of non-magnetic material, and at least one pair of ferrite circuit parts having a given reluctance affixed to said base in juxtaposed relation, said circuit parts positioned to form a gap having a high reluctance relative to said given reluctance and having a bond consisting of a configuration of transported ferrite molecules at contacting surfaces of said circuit parts providing a reluctance of the same order of magnitude as said given reluctance.

3. The magnetic transducer assembly of claim 2 wherein; said circuit parts are bonded together with a bonding agent of glass and glass is disposed in said gap.

4. The magnetic transducer assembly of claim 2, wherein:

(a) said circuit members are affixed to said base with a glass bonding agent; and (b) said non-magnetic base material has a coefficient of expansion which is substantially equal to the coefficient of expansion of said circuit parts material.

5. The magnetic transducer assembly of claim 2, wherein:

(a) said base is a light, sturdy, non-corrosive, non-magnetic metal; and (b) said circuit parts are affixed to said base with an organic glue bonding agent.

6. The magnetic transducer assembly of claim 2, wherein; said base is a non-magnetic ceramic material which is affixed to said circuit parts by a glass bonding agent.

7. The magnetic transducer assembly of claim 2, wherein; said base is a non-magnetic ceramic material which is affixed to said circuit parts by an organic glue bonding agent.

8. The invention according to claim 2, wherein said gap is filled with alternating layers of glass and alumina.

9. The invention according to claim 2, wherein said gap has a spacer therein, said spacer including a layer of material selected from the group consisting of beryllium-copper, hard electroplated chromium, silicon monoxide and mica.

References Cited

UNITED STATES PATENTS

| | | | |
|---|---|---|---|
| 2,763,729 | 9/1956 | Camras | 179—100.2 |
| 2,785,038 | 3/1957 | Ferber | 346—74 |
| 3,024,318 | 3/1962 | Duinker et al. | 179—100.2 |
| 3,187,410 | 6/1965 | Duinker et al. | 179—100.2 |
| 3,335,412 | 8/1967 | Matsumoto | 179—100.2 |
| 3,353,261 | 11/1967 | Bradford et al. | 346—74 |
| 3,402,463 | 9/1968 | Bos et al. | 179—100.2 |
| 3,435,440 | 3/1969 | Nallin | 179—100.2 |

JAMES W. MOFFITT, Primary Examiner

W. F. WHITE, Assistant Examiner

U.S. Cl. X.R.

29—603; 179—100.2; 346—74

UNITED STATES PATENT OFFICE
CERTIFICATE OF CORRECTION

Patent No. 3,544,982 Dated December 1, 1970

Inventor(s) Joseph John Hanak

It is certified that error appears in the above-identified patent and that said Letters Patent are hereby corrected as shown below:

Column 2, line 36 "alfenol" should be --alfecon--

Column 3, line 46 "alfenol" should be --alfecon--

Column 4, line 62 "alfenol" should be --alfecon--

Column 5, line 13 "alfenol" should be --alfecon--

Column 5, line 28 "alfenol" should be --alfecon--

Signed and sealed this 7th day of September 1971.

(SEAL)
Attest:

EDWARD M.FLETCHER,JR.
Attesting Officer

ROBERT GOTTSCHALK
Acting Commissioner of Pate